United States Patent [19]
Yokota

[11] Patent Number: 5,260,008
[45] Date of Patent: * Nov. 9, 1993

[54] RESIN PROPERTY DETECTION METHOD AND INJECTION CONTROL METHOD FOR INJECTION MOLDER

[75] Inventor: Akira Yokota, Hirakata, Japan
[73] Assignee: Komatsu Ltd., Tokyo, Japan
[*] Notice: The portion of the term of this patent subsequent to Oct. 26, 2010 has been disclaimed.
[21] Appl. No.: 773,563
[22] PCT Filed: Mar. 4, 1991
[86] PCT No.: PCT/JP91/00284
§ 371 Date: Nov. 4, 1991
§ 102(e) Date: Nov. 4, 1991
[87] PCT Pub. No.: WO91/13744
PCT Pub. Date: Sep. 19, 1991

[30] Foreign Application Priority Data
Mar. 5, 1990 [JP] Japan ................................. 2-53988
Jun. 18, 1990 [JP] Japan ................................ 2-159236

[51] Int. Cl.$^5$ ............................................. B29C 45/76
[52] U.S. Cl. ..................... 264/40.1; 264/40.5; 425/145; 425/147; 425/148; 425/149
[58] Field of Search ............. 264/40.1, 40.5, 328.1; 425/135, 145, 146, 147, 148, 149, 150

[56] References Cited
U.S. PATENT DOCUMENTS
3,767,339 10/1973 Hunkar ..................... 425/149
3,822,057 7/1974 Wheeler .................... 425/145
4,066,725 1/1978 Boettner ................... 264/40.1
4,240,996 12/1980 Hunkar ..................... 264/40.1
4,816,197 3/1989 Nunn ....................... 264/40.6
5,057,255 10/1991 Sato et al. ................. 425/145

FOREIGN PATENT DOCUMENTS
0325076A1 12/1988 European Pat. Off. .
52-151352 12/1977 Japan .
62-184825 8/1987 Japan .
63-150632 6/1988 Japan .

OTHER PUBLICATIONS
Article from Plastics Engineering, "Processing-A Deductive Approach to Process Control" Feb., 1989, pp. 45–47.
Article from Plastverarbeiter, Oct., 1989, pp. 43, 44, 46, 47.

*Primary Examiner*—Jill L. Heitbrink
*Attorney, Agent, or Firm*—Armstrong, Teasdale, Schlafly & Davis

[57] ABSTRACT

A method of detecting the characteristics of resin in an injection molding machine having an on-off operating mechanism for the flow path of the resin and a method of controlling the weight of the injected resin on the basis of the detected characteristics of the injected resin. Such an arrangement is adopted that, in a state where the aforesaid flow path on-off operating mechanism is closed after the resin in plasticized and measured, processes, in which urging forces of predetermined urging values $p_o$, $p$ are applied to the screw to balancingly move the screw until it stops, are successively carried out under a given molten state value Z of the resin, and the relationship between the urging value $p_o$, $p$ and the moving distance $S_T$ of the screw are approximated by a given functional equation, to thereby obtain the relationship between a molten resin pressure P and a molten resin volume.

13 Claims, 6 Drawing Sheets

RESIN PROPERTY DETECTION METHOD AND INJECTION CONTROL METHOD FOR INJECTION MOLDER

FIELD OF THE INVENTION

The present invention relates to a method for detecting the resin property of plasticized synthetic resin in an injection molder which has a flow path opening/closing mechanism in the passage between the cylinder of the molder and the cavity of a mold so as to block the resin flow between the cylinder and the cavity, and to an injection control method for controlling the weight of the plasticized synthetic resin injected from the cylinder of the injection molder to fill the cavity of the form, on the basis of the detected resin property.

BACKGROUND OF THE INVENTION

In the conventional injection molding of plasticized synthetic resin by an injection molder, the weight of the injected plasticized synthetic resin varies with the molten resin pressure, the molten resin specific volume or the molten state of the resin indicated by the molten resin temperature etc. (including the influence of the disturbance on the molding system). Therefore, it is difficult to form products of a constant quality. To cope with this problem, a number of proposals, so-called adaptive control, have been made. The art disclosed in the Japanese Patent Laid Open Publication No. 84932 of Showa 56 (the year 1981) is an example.

Basically, in the adaptive control method, when the influence of a disturbance on the molding system and change in the molten resin pressure, molten resin temperature or mold temperature are detected, a controllable molding condition (pressure, time, etc.) other than the detected factors are changed into a control factor, thereby assuring the constant product quality.

However, this control method has the following disadvantages:

1. Preliminary study and analysis are necessary to determine the correlation between the detected factor according to the mold and the product quality and between the control factor and the product quality.
2. With the same plasticized synthetic resin, the correlation between the detected factor and the product quality and between the control factor and the product quality varies greatly depending on the mold. Therefore, the study and analysis described in the item 1 above must be repeated each time the mold is changed.

Injection molding process is generally described in view of the plasticized synthetic resin property such as the PVT property [molten resin pressure—molten resin specific volume—molten resin temperature (=molten state)]. Based on this fact, some proposals have been made to control the molding process by the PVT property, such as described on the pages 11 and 12 of Modern Plastics International, October 1989. This PVT property-based control method also has the following problems:

(i) To control the molding process by the PVT property, the PVT property must be given or determined in advance for practical use. Determination of the PVT property requires accurate measurement using a special measurement instrument in a test facility.

(ii) Various kinds of plasticized synthetic resins are used in actual injection molding and, in many cases, new plasticized synthetic resins are introduced one after another. Therefore, if the PVT property of certain type of plasticized synthetic resin can be obtained experimentally to provide the experimental determination of the PVT property of all the plasticized synthetic resins to be used would involve enormous time and expense and is not feasible.

(iii) Moreover, for the same plasticized synthetic resin, the experimentally determined PVT property does not always coincide with the PVT property in an injection molder actually used at the injection molding site because of the following reason. In an experimental equipment, the plasticized synthetic resin is heated only externally. In an actual injection molder, in contrast, the thermal history and extremely large shearing force during the melting process of the plasticized synthetic resin cause slight change in the molecular distribution of the resin. Consequently, the melting behavior of the resin in the actual injection molder may be different from that in the experimental equipment.

(iv) Furthermore, for recycled use of waste resin material, the actual injection molding may use reclaimed plasticized synthetic resin by mixing new plasticized synthetic resin material. Even if new plasticized synthetic resin pellets are used, the quality of the pellets may vary among different production lots or even in the same production lot. Accordingly, it is very difficult to apply the experimentally obtained PVT property directly to the actual injection molding.

The molten resin temperature (T) as the PVT property, or the molten state such as flowability of resin indicated by the molten resin temperature (T) can also be indicated by the revolution or back-pressure of the screw, the time required for measuring the molten resin in the actual injection molding, or a combination of some of these three factors. Therefore, the PVT property can be generalized by replacing the molten resin temperature (T) with the molten state (Z).

It is an object of the present invention to solve the above problems in the resin property-based molding process control method. Specifically, an object of the present invention is:

(i) to provide a method for detecting the resin property of plasticized synthetic resin, which is capable of:
  1. Detecting easily the resin property of the plasticized synthetic resin presently used in injection molders at the actual injection molding site, and
  2. utilizing the thus detected resin property directly for controlling the injection molding process under way in the site, and (ii) to provide an injection control method capable of calculating an appropriate screw travel distance on the basis of the resin property detected by the above-mentioned detection method by using a given calculation formula, thereby controlling the weight of plasticized synthetic resin injected from the cylinder of the injection molder to fill the cavity of a mold.

DISCLOSURE OF THE INVENTION

According to the present invention, in order to achieve the above object, the resin property detection method for an injection molder which has a flow path opening/closing mechanism between the cylinder of the injection molder and the cavity of a mold so as to block the plasticized synthetic resin flow between the cylinder and the cavity comprises the steps of: conducting the following two processes sequentially, with plasticized synthetic resin of a specified molten resin state value Z:

(a) the first process comprising the steps of applying a reference pushing force value $p_o$ to the screw to effect the balancing movement of the screw after measuring the plasticized synthetic resin, with the flow path closing mechanism closed to block the resin flow, and obtaining the positional value of the screw at the reference stop position where the screw stops its balancing movement, and (b) the second process comprising the steps of applying a pushing force value p different from the reference pressure value $p_o$, to the screw to effect the balancing movement of the screw, obtaining the positional value of the screw at the position where the screw stops its balancing movement, and calculating the travel distance $S_T$ from the reference stop position of the screw; and obtaining the relational formula for the molten resin pressure value P and the molten resin volume value with the specified molten resin state value Z by through the approximation of the relation among the pushing force values $p_o$ and p and the travel distance $S_T$ by using a specified functional equation.

The resin property detection method of the present invention may also comprise the steps of repeating the above first and second processes under different molten state values Z and under different pushing force values p in the second process, and obtaining the relational formula for the molten resin pressure value P, the molten resin volume value and the molten state value Z through the approximation of the relation among the pushing force values $p_o$ and p, the travel distance $S_T$ and the molten state value Z by using a specified functional equation.

An example of the specified functional equation is as follows:

$$V/V_o = \exp\{a(Z) \cdot (\sqrt{P/P_o} - 1)\};$$

wherein
V: molten resin specific volume at molten resin pressure value P
$V_o$: molten resin specific volume at reference molten resin pressure value $P_o$
$P_o$: reference molten resin pressure value (reference pushing force value $p_o$)
P: molten resin pressure value (pushing force value p)
a(Z): constant determined by the molten state value The molten resin specific volume valve V can be obtained through the proportional calculation from the molten resin volume value and molten resin specific volume value V calculated in the following procedure:

First, the following three processes are conducted sequentially with the above-mentioned molten state value Z of plasticized synthetic resin:

(a) The first process comprising the steps of closing the flow path opening/closing mechanism to block the plasticized synthetic resin flow, and under the blocked state of the flow, applying either of the pushing force values $p_o$ and p to the screw so as to effect the balancing movement of the screw, and obtaining the positional value of the screw at the first stop position where the screw stops its balancing movement.

(b) The second process comprising the steps of opening the flow path opening/closing mechanism to allow the plasticized synthetic resin to flow, and under the available state of the flow, applying a pushing force to the screw so as to permit the resin of an appropriate weight value G to be injected.

(c) The third process comprising the steps of closing the flow path opening/closing mechanism to block the plasticized synthetic resin flow after injecting the plasticized synthetic resin of the weight value G, and under the blocked state of the flow, applying the same pushing force value as that for the first process to the screw so as to effect the balancing movement of the screw, and obtaining the positional value of the screw at the second stop position where the screw stops its balancing movement.

Then, the molten resin volume of the injected plasticized synthetic resin is obtained on the basis of the positional values of the screw at the first and second stop positions, and finally the molten resin specific volume value V is calculated from the obtained molten resin volume value and the weight value G.

Here, if it is necessary to obtain a true molten resin specific volume value V, or in other words, if the type of injection molder and in the molding condition are to be changed substantially, the above-mentioned proportional calculation to obtain the molten resin specific volume value V, the molten resin volume remaining in front of the screw in the cylinder have to be taken into consideration. If the flow path opening/closing mechanism is a block value provided in the nozzle of the injection molder, the true molten resin specific volume value V can be obtained by calculating the molten resin volume value in the following procedure:

i) When the molten resin volume value remaining between the screw end and the block valve is given as a design value:

The given molten resin volume value is converted to the travel distance of the screw and added to the aforementioned travel distance $S_T$, and the molten resin volume value of the injected plasticized synthetic resin is calculated from the sum of the travel distances.

ii) When the molten resin volume value remaining between the screw end and the block valve is unknown:

With plasticized synthetic resin of the molten state value Z, the specified pushing force value p is applied to the screw at different positions, with the block valve closed to prevent the resin flow. As the screw changes its position by the balancing movement under the pushing force value p, the travel distance of the screw from the previous position to the present position is calculated. Extrapolation is used to obtain, from the stop positions and the respective travel distances, the positional value of the screw where the travel distance by the specified pushing force value p becomes zero. This positional value is then added to the aforementioned travel distance $S_T$. The molten resin volume value of the injected plasticized synthetic resin is obtained from the sum of the travel distances.

According to another embodiment of the present invention, in order to achieve the above object, the resin property detection method for an injection molder which has a flow path opening/closing mechanism between the cylinder of the molder and the cavity of a mold so as to block the plasticized synthetic resin flow between the cylinder and the cavity comprises the steps of: conducting the following three processes sequentially, with plasticized synthetic resin of various molten resin state values Z:

(a) the first process comprising the steps of closing the flow path opening/closing mechanism to block the resin flow, and under the blocked state of the resin flow, applying various pushing force values p to the screw so as to effect the balancing movement of the screw, and obtaining the positional value of the screw at each first stop position where the screw stops its balancing movement under each pushing force value p, (b) the second process comprising the steps of opening the flow path opening/closing mechanism to allow the resin to flow, and under the blocked state of the resin flow, applying a pushing force to the screw so as to permit plasticized synthetic resin of an appropriate weight value G to be injected, and (c) the third process comprising the steps of closing the flow path opening/closing mechanism to block the resin flow after the injection of the resin of the weight value G, applying the various pushing force values p of the same values as those for the first process to the screw so as to effect the balancing movement of the screw, and obtaining the positional value of the screw at each second stop position where the screw stops its balancing movement under each pushing force value p;

and obtaining the molten resin volume of injected plasticized resin for each molten state value Z, on the basis of the positional values of the screw at the first and second stop positions under each pushing force value p, and calculating the molten resin specific volume value V from each molten resin volume value and aforementioned weight value G, thereby obtaining the PVZ property relation formula for the molten resin pressure value P, molten resin specific volume value V and molten state value Z.

Thus, according to the detecting method of the resin property for the injection molder of the present invention, the resin property of the plasticized synthetic resin presently used for injection molding can be detected easily in the injection molder installed at the injection molding site. Moreover, the thus detected resin property can be utilized directly in controlling the actual injection molding process at the site.

According to the detecting method of the resin property for the injection molder of the present invention, in order to achieve the aforementioned object, an injection control method for controlling the weight of the plasticized synthetic resin injected from the cylinder of an injection molder to fill the cavity of a mold comprises the steps of: calculating the travel distance $S_D$ of the screw to the position for injecting plasticized synthetic resin by the amount corresponding to the weight value G of a product by using a specified calculation formula, on the basis of the weight value G of the product, the molten state value Z of the plasticized synthetic resin to be injected, the molten resin pressure value $P_I$ and positional value $S_I$ immediately before injection, the molten resin pressure value $P_H$ during the dwelling process following the injection and the PVZ property relation formula for the plasticized synthetic resin; presetting the calculated travel distance $S_D$; and terminating the injection of the resin into the cavity when the screw has moved for the preset travel distance $S_D$ from the stop position immediately before injection.

An example of the specified calculation formula is as follows:

$$S_D = S_I - S_H = V(P_H,Z) \cdot \{G/A - S_I[1/V(P_I,Z) - 1/V(P_H,Z)]\}$$

wherein $S_H$: positional value of the screw during the dwelling process following the injection, for the molten state value Z $S_I$: positional value of the screw immediately before the injection, for the molten state value Z G: weight value of a target product A: projected sectional area of the screw·

$V(P_H,Z)$: molten resin specific volume value for the given molten state value Z and the molten resin pressure value $P_H$ during the dwelling process following the injection, for the molten state value Z $V(P_I,Z)$: molten resin specific volume value for the given molten state value Z and the molten resin pressure value $P_I$ immediately before the injection, for the molten state value Z Thus, according to the injection control method of the present invention, the travel distance of the screw for injecting resin of a constant weight can be set automatically on the basis of the PVZ property detected in the aforementioned resin property detection method and the calculation formula, resulting in the constant quality of the products. In addition, it is necessary to test various molten resin pressure values $P_I$ and $P_H$ and molten state value Z before the molding condition is determined. According to the present invention, however, the travel distance is set automatically provided that a target weight value is given, so that the molding condition can be determined efficiently.

The molten state value Z may be any value selected from among the molten resin temperature, the revolution or back-pressure of the screw, the time required for measuring resin, or a combination of some of these elements.

BRIEF DESCRIPTION OF THE DRAWINGS

FIGS. 1 through 7 are drawings for explaining preferred embodiments of the resin property detection method and the injection control method for an injection molder according to the present invention:

PREFERRED EMBODIMENTS OF THE INVENTION

Some embodiments of the resin property detection method and injection control method for an injection molder according to the present invention are described with reference to attached drawings.

Figure 1:
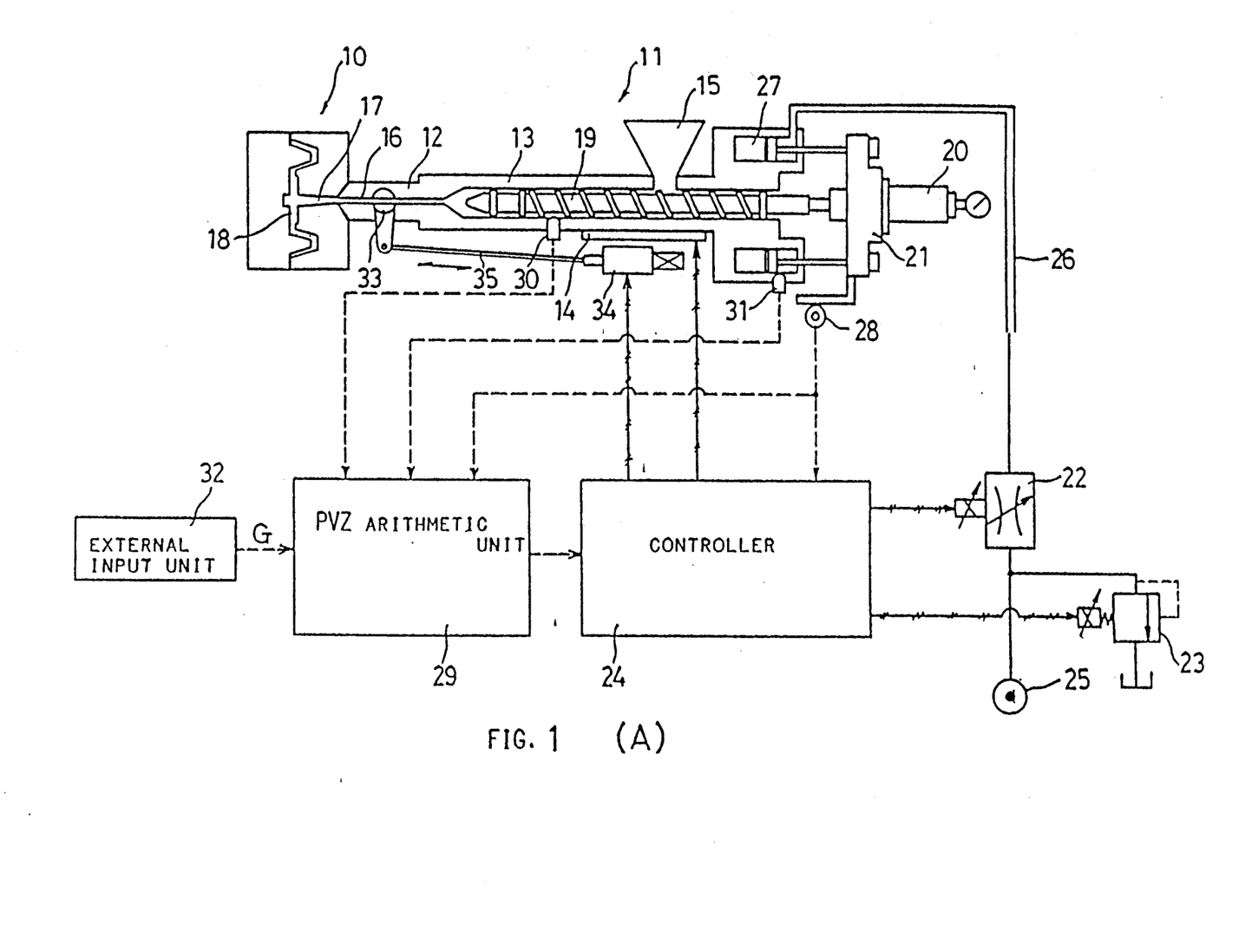
FIGS. 1(A) and 1(B) are a semi-diagrammatical vertical sectional view and a partially enlarged vertical sectional view, respectively, of the injection molder relevant to the present invention.

Referring to the FIG. 1(A), a schematical view of an entire injection molder, in forming a product by injection molding, an injection molder 11 is connected through a nozzle 12 with a mold 10 in which the product is formed. A screw 19 is contained in the cylinder 13 of the injection molder 11. Resin pellets supplied from a hopper 15 are melted and mixed in the cylinder 13 heated by a heater 14 into a plasticized synthetic resin, while the molten resin is measured and then injected by the screw 19 through a flow passage 16 formed in the nozzle 12 and through a gate 17 into the cavity 18 of the mold 10. To melt and mix the resin pellets, the screw 19 is rotated by a screw-driving motor 20. The screw 19 and the screw-driving motor 20 are fixed on a base 21 which is moved laterally in the drawing, by means of pressure oil supplied to a hydraulic piston device 27 through a pipe line 26 from a pressure oil supply 25. To supply the pressure oil, an electromagnetic flow valve 22 and an electromagnetic pressure valve 23 are controlled by a controller 24. In other words, the movement of the screw 19 toward and away from the nozzle 12 to measure the molten resin amount to be injected and to inject the measured molten resin into the cavity 18 of the mold 10, and the application of a specified pushing force to the screw 19 to provide a specified molten resin pressure to the molten resin in the cylinder 13 are all controlled through the base 21 by the pressure oil supplied to the hydraulic piston device 27. The base 21 is engaged with a screw position detector 28 for detecting the positional value of the screw 19, which indicates "0" at the left end, in the drawing, in the cylinder 13 and increases the value as the screw 19 moves toward the right. The screw position detector 28 comprises a potentiometer and an encoder etc. The positional values of the screw 19 detected by the detector 28 minute by minute are sent to the controller 24 as well as to a PVZ arithmetic unit 29 which determines the PVZ property relation formula for plasticized synthetic resin when detecting the resin property. The PVZ arithmetic unit 29 also operates the PV property relation formula to calculate the travel distance of the screw 19 and supplies the calculated result to the controller 24, thereby controlling the injection. The molten resin temperature value in the cylinder 13 detected by a resin temperature detector 30 is also transmitted, as the molten state value Z of the molten resin, to the PVZ arithmetic unit 29. The oil pressure value for the hydraulic piston device 27, detected by an oil pressure detector 31, is also sent to the arithmetic unit 29 as the pushing force applied to the screw 19 or the molten resin pressure value P in the cylinder 13. 32 is an external Input unit through which to input the measured volume of injected molten resin to the PVZ arithmetic unit 29 when detecting the resin property. The molten resin pressure value P, molten state value (molten resin temperature value) Z and other conditional values set for detecting the resin property are also input from the external Input unit 32 through the PVZ arithmetic unit 29 to the controller 24. The target weight of molten resin to be injected is also input from the external Input unit 32 to the PVZ arithmetic unit 29.

The flow passage 16 of the nozzle 12 comprises a block valve 33 as a flow path opening/closing mechanism of the present invention so as to interrupt the molten resin flow. The block valve 33 is operated through an operation lever 35 by an electromagnetic driving unit 34 which is controlled by the controller 24.

As shown in FIG. 1(B), a ring-shaped axially slidably valve plug 39 is provided between the conical end portion 36 and the flange projection 38 at the end of the spiral portion 37 of the screw 19. As the molten resin pressure in front of the screw 19 or in the left side of the screw end increases, the slidable valve plug 39 is pressed against the flange projection 38, thus preventing the molten resin from flowing back to the right. Thus, the flange projection 38 and the ring-shaped slidable valve plug 39 constitute a check valve 40. It must be noted that even if the screw position detector 28 reads "0" for the position of the screw 19, molten plasticized synthetic resin exists in the space between the front end of the screw 19 and the block valve 33, or more specifically between the check valve 40 and the block valve 33.

Now, some embodiments the present invention on the resin property detection method for an injection molder are described in detail.

First Embodiment

Figure 2:
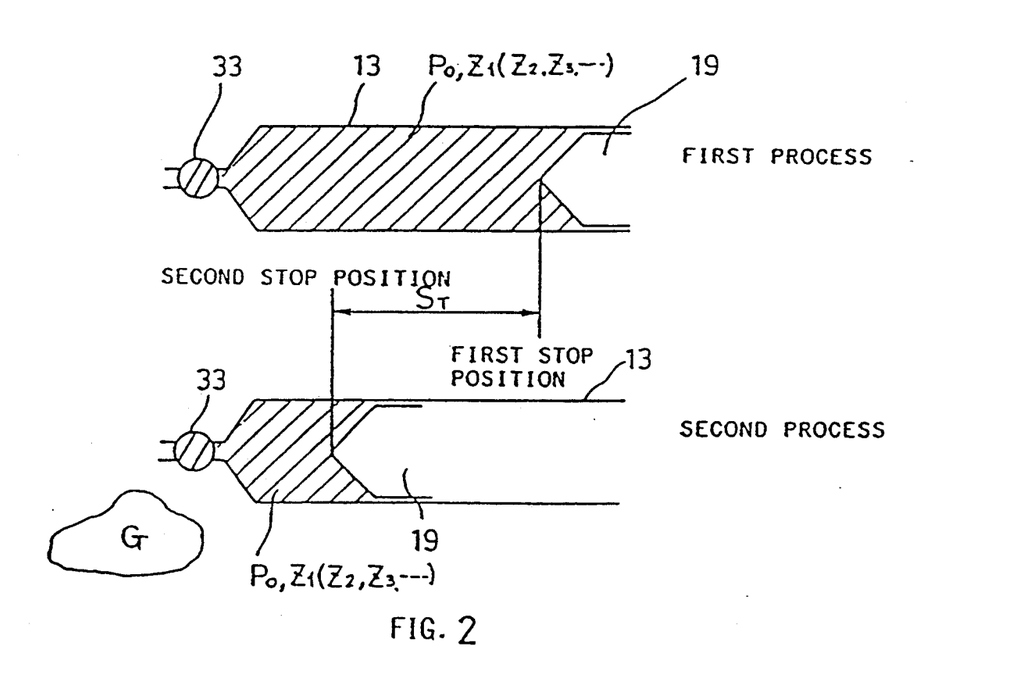
FIGS. 2 and 3 are vertical sectional drawings showing the operation state of the screw in the first and second embodiments, respectively, of the present invention.

For the first phase of the method, the following three processes are repeated with various molten state values (molten resin temperature values) $Z_1, Z_2, Z_3, \ldots$, under the constant molten resin pressure value $p_o$, to obtain the molten resin specific volume values $V_{01}, V_{02}, V_{03}, \ldots$ for the respective molten state values $Z_1, Z_2, Z_3, \ldots$ (see FIG. 2).

1) First Process

The rotating screw 19 drives the molten plasticized synthetic resin toward the front of the screw 19. In the first process in which the block valve 33 is closed, the screw 19 is moved back because of the pressure of the molten resin existing in front of the screw 19. While the screw 19 is retreated to a preliminarily set initial position, the amount of the molten resin to be injected is measured. When the screw 19 has reached the initial position, the screw rotation is stopped. The arrival of the screw at the initial position is detected by the screw position detector 28 which sends the positional value of the screw 19 at the initial position to the controller 24. On the basis of this positional value, the controller 24 controls the pressure oil supply to the hydraulic piston device 27 so that a specified pushing force value $p_o$ is applied to the screw 19. Under the specified pushing force, the screw 19 makes a forward balancing movement, compressing the molten resin in front of the screw 19 with the aid of the function of the check valve 40. Thus, the molten resin pressure in the cylinder 13 increases. The screw 19 stops its forward movement at a first stop position when the applied pushing force balances the pressure of the compressed molten resin. The screw position detector 28 detects the positional value of the screw 19 at the first stop position and outputs the value to the PVZ arithmetic unit 29. When the screw 19 is at the first stop position, the molten resin pressure value $P_o$ in front of the screw 19 is to correspond to the pushing force value $p_o$ applied to the screw 19.

2) Second Process

The block valve 33 is opened, and the screw 19 is moved for a specified distance by the pushing force applied to the screw 19, so that molten resin is injected by the amount corresponding to the specified distance. The weight value G of the amount of injected molten resin is measured by an external measuring instrument. The measured weight value G is input from the external Input unit 32 to the PVZ arithmetic unit 29.

3) Third Process

The block valve 33 is closed again, and with this state, the oil pressure is controlled by the controller 24 in the same manner as in the first process so as to apply the specified pushing force value $p_o$ to the screw 19. Due to this pushing force, the screw 19 makes a forward or backward balancing movement, thus compressing the molten resin in front of the screw 19. The screw 19 stops at a second stop position when the applied pushing force balances the compressed molten resin pressure. The screw position detector 28 detects the positional value of the screw 19 at the second stop position and transmits the value to the PVZ arithmetic unit 29.

The PVZ arithmetic unit 29 calculates the difference $S_T$ between the positional value of the first stop position and that of the second stop position, or in other words, the molten resin volume value corresponding to the weight value G of the injected molten resin. The calculated molten resin volume value is divided by the weight value G to obtain a molten resin specific volume value $V_0$.

Thus, in the first phase, the series of the processes is repeated for various molten state values (molten resin temperature values) $Z_1, Z_2, Z_3, \ldots$ under a constant specified pushing force value $p_0$ (molten resin pressure value $P_0$) to obtain the molten resin specific volume values $V_{01}, V_{02}, V_{03}, \ldots$.

For the second phase, the following two processes are repeated for various molten state values (molten resin temperature values) $Z_1, Z_2, Z_3, \ldots$ under various molten resin pressure values $P_1, P_2, P_3, \ldots$, to obtain the respective molten resin specific volume values $V_{11}, V_{21}, V_{31}, \ldots; V_{12}, V_{22}, V_{32}, \ldots; V_{13}, V_{23}, V_{33}, \ldots$ (see FIG. 3).

1) First Process

Figure 3:
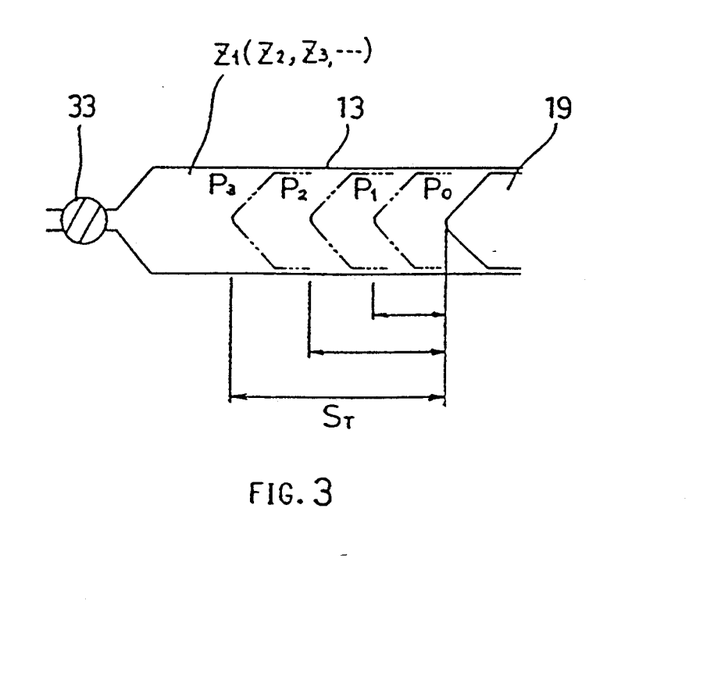

Similar to the first process of the first phase, the screw 19 is rotated with the block valve 33 closed. The screw 19 is retreated and stopped at a preliminarily set initial position while the molten resin is measured. Then, a specified pushing force value $p_0$ is applied to the screw 19 to move the screw 19 forward so that the molten resin is compressed. The screw 19 stops its forward movement at a first stop position when the applied pushing force balances the pressure of the compressed molten resin. The positional value of the screw 19 at the first stop position is detected by the screw position detector 28 and sent to the PVZ arithmetic unit 29. Other operations are the same as those in the first process of the first phase.

2) Second Process

A specified pushing force value p is applied to the screw 19 with the block valve 33 closed. This time, the applied specified pushing force value p is increased gradually from $p_1$ to $p_2$ to $p_3$ and so on, with the pushing force value $p_0$ in the first process as a reference, thus gradually compressing the molten resin. When each of the pushing force values $p_1, p_2, p_3, \ldots$ is applied, the screw 19 makes a balancing movement and stops at second, third, fourth or subsequent stop position. The positional value of each stop position is detected by the screw position detector 28 and sent to the PVZ arithmetic unit 29.

The PVZ arithmetic unit 29 calculates the difference $S_T$ of the positional value at the second, third, fourth or subsequent stop position from the positional value at the first stop position to obtain the molten resin volume values on the basis of the calculated difference. From each of the thus obtained molten resin volume values and the molten resin specific volume values $V_{01}$ ($V_{02}, V_{03}, \ldots$) calculated in the first phase, molten resin specific volume values $V_{11}, V_{21}, V_{31}, \ldots (V_{12}, V_{22}, V_{32}, \ldots; V_{13}, V_{23}, V_{33}, \ldots)$ are obtained by the proportional calculation. This proportional calculation is based on the fact that, for the compressed molten resin of the same molten state value (molten resin temperature value) Z and of the same weight value G, the molten resin specific volume value V is obtained from the ratios of molten resin volume values in case that the molten resin pressure value $p_0$ (pushing force value $p_0$) is changed to $P_1, P_2, P_3, \ldots$ (pushing force value $p_1, p_2, p_3, \ldots$).

Thus, the series of calculation processes is repeated for each of the molten state values (molten resin temperature values) $Z_1, Z_2, Z_3, \ldots$ under each of the pushing force values $p_1, p_2, p_3, \ldots$ applied to the screw 19 (the molten resin pressure values $P_1, P_2, P_3, \ldots$), thereby obtaining the molten resin specific volume values $V_{11}, V_{21}, V_{31}, \ldots; V_{12}, V_{22}, V_{32}, \ldots; V_{13}, V_{23}, V_{33}, \ldots$. In this calculation process, the molten state value (molten resin temperature value) Z is changed by controlling the heater 14 by the controller 24.

Even with the screw 19 indicating at a position of the positional value "0", the molten resin remains between the front end of the screw 19 and the block valve 33. As various pushing forces are applied to the screw 19, the remaining molten resin is compressed. This results in the positional values of the screw 19 at respective stop positions. Accordingly, if the PVZ property relation formula established for a particular injection molder is applied to another injection molder whose remaining molten resin volume value is different from that in the particular injection molder, the calculation result will contain a large error that cannot be ignored.

In such a case, the remaining molten resin volume must be corrected to obtain an accurate molten resin specific volume value V. The correction method is described below:

i) When the remaining molten resin volume value is known as a design value for the equipment and given in terms of the travel distance $S_0$ of the screw 19:

With the molten resin of the same molten state value (molten resin temperature value) Z and of the same weight value G, pushing force values $p_X$ and $p_Y$ are applied sequentially to the screw 19 after the molten resin has been measured. When the molten resin pressure value becomes $P_X$ or $P_Y$ and the screw 19 stops its movement, the positional value $S_x$ or $S_y$ of the screw 19 at the stop position is detected. The travel distance $S_0$ is added to each of these positional values $S_x$ and $S_y$ to obtain each of these corrective positional values $S_X$ ($=S_x+S_0$) and $S_Y$ ($=S_y+S_0$). Then, the molten resin specific volume values $V_X$ and $V_Y$ can be expressed by the following equations, respectively.

$$V_X = (\pi/4 \cdot D^2 \cdot S_X)/G \tag{1}$$

$$V_Y = (\pi/4 \cdot D^2 \cdot S_Y)/G \tag{2}$$

D: diameter of the screw

By taking the ratio of these equations, the following equation holds:

$$V_X/V_Y = S_X/S_Y (=(S_0+S_x)/(S_0+S_y)) \tag{3}$$

Figure 4:
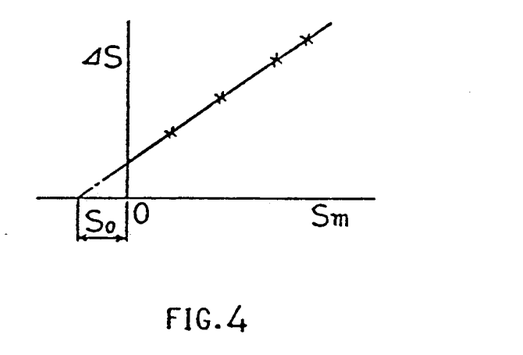
FIG. 4 is a graph explaining the extrapolation method for obtaining the molten resin volume value remaining in front of the screw.

If the molten resin specific volume value $V_Y$ is the molten resin specific volume values $V_{01}, V_{02}, V_{03}, \ldots$ obtained in the first phase, the molten resin specific volume value $V_X$ can be calculated easily from the equation (3). Since the present embodiment of the invention obtains the molten resin specific volume value V similarly by calculating the ratios, the above method can be used directly in the present embodiment.

ii) When the remaining molten resin volume value is unknown:

As shown on FIG. 4, the compression amount of the molten resin or the travel distance S of the screw 19 for the compression is proportional to the molten resin volume before compression or the positional value $S_m$ of the screw 19 before compression. The graph of a linear function is drawn by changing the positional value $S_m$ of the screw 19 in steps for a constant molten resin pressure value P and a constant molten state value (molten resin temperature value) Z. The travel distance $S_0$ is obtained easily by the extrapolation on this graph. Other operations are the same as those described above.

For the third phase, each of the molten resin pressure values $P_0, P_1, P_2, \ldots$, each of the molten resin specific volume values $V_{01}, V_{02}, V_{03}, \ldots; V_{11}, V_{12}, V_{13}, \ldots; V_{21}, V_{22}, V_{23}, \ldots$ and each of the molten state values (molten resin temperature value) $Z_1, Z_2, Z_3, \ldots$ obtained in the first and second phases are substituted in the general formula for the PVZ property, to establish the PVZ property relation formula.

Meanwhile, it is possible to obtain the following generalized function from the equation (3):

$$V/V_0 = f(P/P_0) \qquad (4)$$

wherein

P, V: given molten resin pressure value and molten resin specific volume value for the given molten resin pressure value $P_0, V_0$: reference molten resin pressure value and molten resin specific volume value for the reference molten resin pressure value The above molten resin pressure values P and $P_0$ and molten resin specific volume values V and $V_0$ are given at the same molten state value (molten resin temperature value) Z.

From the equation (4), the inventor has found that the PV property can be approximated by the following experimental formula:

$$f(P/P_o) = \exp\{a(\sqrt{P/P_o} - 1)\} \qquad (5)$$

wherein a: constant

Therefore, if the value for the constant "a" is obtained by changing the given molten resin pressure value P, the PV (Z=constant) property relation formula can be obtained.

Further, the inventor has found that the value of the constant "a" is a function of the molten state value (molten resin temperature value) Z and can be approximated as follows:

$$a(Z) = b \cdot Z + c \qquad (6)$$

b, c: constants

The following general formula can be obtained from the equations (4), (5) and (6):

$$V = V_o \cdot \exp\{(b \cdot Z + c) \cdot (\sqrt{P/P_o} - 1)\} \qquad (7)$$

When each of the molten resin pressure values $P_0, P_1, P_2, \ldots$, each of the molten resin specific volume values $V_{01}, V_{02}, V_{03}, \ldots; V_{11}, V_{12}, V_{13}, \ldots; V_{21}, V_{22}, V_{23}, \ldots$ and each of the molten state values (molten resin temperature values) $Z_1, Z_2, Z_3, \ldots$ obtained in the first and second phases are substituted in the equation (7), the constants "b" and "c" are fixed so that the PVZ property relation formula can be established.

If the molten resin specific volume value $V_0$ for the reference molten resin pressure value $P_0$ is obtained with the molten state value (molten resin temperature value) Z varied, the molten state value (molten resin temperature value) Z and the molten resin specific volume value V are approximated as expressed by the following linear equation:

$$V_0 = \alpha \cdot Z + \beta \qquad (8)$$

$\alpha, \beta$: constants

Therefore, when the equation (8) is substituted in the equation (7), the following equation results:

$$V = (\alpha \cdot Z + \beta) \cdot \exp\{(b \cdot Z + c) \cdot (\sqrt{P/P_o} - 1)\}$$

In the previous process, the constant "a" was approximated by a linear equation. When the molten state value (molten resin temperature value) Z changes, the constant "a" changes with the molten state value (molten resin temperature value) Z as a variable. Therefore, the constant "a" can be modified to be adaptable to actual equipment by using the polynomial approximation of the molten state value (molten resin temperature value) Z as indicated by the following equation:

$$a(Z) = b' \cdot Z^m + b'' \cdot Z^{m-1} + \ldots + b^{m'} \cdot Z + c'$$

$b', b'' \ldots b^{m'}, c'$: constants

Similarly, with a constant molten resin pressure value P, when the molten state value (molten resin temperature value) Z changes, the molten resin specific volume value $V_0$ changes with the molten state value (molten resin temperature value) Z as a variable. Therefore, it is preferable to employ the following polynoimal approximation of the molten state value (molten resin temperature value) Z:

$$V_0 = a' \cdot Z^n + a'' \cdot Z^{n-1} + \ldots + a^{n'} \cdot Z + \beta'$$

$a', a'', \ldots a^{n'}, \beta'$: constants

Second Embodiment

Now the second embodiment of a resin property detection method according to the present invention is described. For this embodiment, only the processes different from those in the first embodiment are described, with the description of the same processes omitted.

The PVZ property relation formula is established by repeating the following three processes for each of the molten state values (molten resin temperature values) $Z, Z_2, Z_3, \ldots$ 1) First Process Similar to the first process of the first phase of the first embodiment, the screw 19 is rotated with the block valve 33 closed, and stopped when it has been retreated to a preliminarily set initial position. Then, pushing force values $p_{S0}, p_{S1}, p_{S2}, \ldots, p_{Sn}$ are applied sequentially to the screw 19 to compress the molten resin. Under each of these pushing force values $p_{S0}, p_{S1}, p_{S2}, \ldots, p_{Sn}$, the screw 19 makes a balancing movement and stops at a first stop position indicated by the positional value $S_{S0}, S_{S1}, S_{S2}, \ldots,$ or $S_{Sn}$, which is detected by the screw position detector 28 and sent to the PVZ arithmetic unit 29. Other operations are the same as those in the first process of the first phase in the first embodiment.

2) Second Process

A pushing force value p, which is applied immediately before injection in the ordinary production process, is applied to the screw 19 and the block valve 33 is opened, so that the molten resin of the weight for one batch is injected into the cavity 18 of the mold 10 to form an actual product. Next, a pushing force value p, which is applied during the dwelling following the injection in the ordinary production process, is applied to the screw 19 and the block valve 33 is closed. The weight value G of the injected molten resin is measured by an external measuring instrument and input through the external Input unit 32 to the PVZ arithmetic unit 29.

3) Third Process

Similar to the first process, pushing force values $p_{S0}, p_{S1}, p_{S2}, \ldots, p_{Sn}$ are applied sequentially to the screw 19. Under each of these pushing force values $p_{S0}, p_{S1}, p_{S2}, \ldots, p_{Sn}$, the screw 19 makes a balancing movement and stops at a second stop position indicated by the positional value $S_{F0}, S_{F1}, S_{F2}, \ldots,$ or $S_{Fn}$, which is detected by the screw position detector 28 and sent to the PVZ arithmetic unit 29.

In a series of above-mentioned processes, the molten resin of the weight value G is injected "n" times. Accordingly, for a constant molten state value (molten resin temperature value) Z, the following equation holds:

$$\frac{G}{A} = \frac{S_o + S_{So}}{V(P_{So}, Z)} - \frac{S_o + S_{Fo}}{V(P_{So}, Z)}$$

$$= \frac{S_o + S_{S1}}{V(P_{S1}, Z)} - \frac{S_o + S_{F1}}{V(P_{S1}, Z)}$$

$$= \ldots$$

$$= \frac{S_o + S_{Sn}}{V(P_{Sn}, Z)} - \frac{S_o + S_{Fn}}{V(P_{Sn}, Z)}$$

$$\frac{G}{A} = \frac{S_{Sn} - S_{Fn}}{V(P_{Sn}, Z)} = \frac{\Delta S_n}{V(P_{Sn}, Z)} \qquad (9)$$

wherein

A: projected sectional area of the screw 19

$S_0$: travel distance of the screw 19 converted from the remaining molten resin volume value The following equation is obtained by substituting the equation (4) in the equation (5):

$$\frac{V(P_{Sn}, Z)}{V(P_{So}, Z)} = \exp\{a \cdot (\sqrt{P_{Sn}/P_{So}} - 1)\} \qquad (10)$$

$$= \frac{\Delta S_n}{\Delta S_o} \left( = \frac{S_{Sn} - S_{Fn}}{S_{So} - S_{Fo}} \right)$$

By operating the above equation (10), the formula for such relation between the molten resin pressure (P) and the weight value G of the molten resin injected by one injecting operation that will not give an adverse affect on an actual molded product can be obtained.

By substituting the equation (10) in the equation (9), the following equation holds:

$$\frac{G}{A} = \left[\frac{1}{\Delta S_o}\right] \cdot \frac{V(P_n, Z)}{\exp\{a \cdot (\sqrt{P_{Sn}/P_{So}} - 1)\}} \qquad (11)$$

The equation (11) is the PV property relation formula for a constant molten state value (molten resin temperature value) Z. The PVZ arithmetic unit 29 operates this equation (11) to establish the PV property relation formula for a constant molten state value (molten resin temperature value) Z. The similar process is repeated for each of the molten state values (molten resin temperature values) $Z_1, Z_2, Z_3, \ldots$ to establish the PVZ property relation formula for each molten state value.

In the first and second embodiments, the molten resin temperature value is used for the molten state value Z which indicates the molten state of plasticized synthetic resin. The revolution of the screw 19 during plasticization and measurement of the resin, the time required for the measurement, or the back-pressure value of the screw 19 may be used instead of the molten resin temperature value. Even if the revolution or back-pressure value of the screw 19 are constant, the time required for measurement tends to change with the ratio of the reclaimed resin content or of the additive content in the plasticized synthetic resin material etc. The back-pressure value of the screw 19 varies with the temperature of the pressure oil supplied to the hydraulic piston device 27. This change in the back-pressure value can be identified by detecting the oil pressure for the hydraulic piston device 27 by the oil pressure detector 31. If the revolution or back-pressure value of the screw 19 is to be detected at the time of changing the molding condition, the revolution or the value of the back-pressure value to be set for the value at the time of new molding condition may be input through the external Input unit 32 to the PVZ arithmetic unit 29. It is needless to say that the similar PVZ property relation formula can be established in this case. Therefore, when continuous molding operation is started, the travel distance of the screw 19 to the position for injection may be calculated according to the PVZ property relation formula based on the revolution or back-pressure value detected, as a molten state value Z, during the continuous molding process.

In the first and second embodiments, the following equation is used to establish the PVZ property relation formula:

$$V = V_o \cdot \exp\{a(Z) (\sqrt{P/P_o} - 1)\}$$

Alternatively, the Spencer & Gilmore's equation as shown below may be used:

$$V = \frac{R' \cdot T}{P + \pi_1} + \omega \qquad (12)$$

wherein

T: molten resin temperature value (molten state value Z)

$\pi_1, \omega, R'$: constants determined by the type of plasticized synthetic resin The values for the constants $\pi_1$, $\omega$ and $R'$ may be obtained in the following procedure:

Firstly, the molten resin specific volume value $V_0$ under a constant molten resin pressure value $P_0$ and at a constant molten resin temperature value $T_0$ is obtained in the same method as in the first phase of the first embodiment. Secondly, under the same molten resin pressure value $P_0$, the value for the constant $\omega$ is obtained with the molten resin temperature value $T$ varied. Then, at the constant molten resin temperature value $T_0$, the molten resin volume value is obtained with the molten resin pressure value $P$ set at $P_1$, in the same method as in the second phase of the first embodiment, and the molten resin specific volume value $V_1$ under the molten resin pressure value $P_1$ is calculated from the above-mentioned molten resin specific volume value $V_0$ by the proportional calculation. On the basis of the molten resin pressure values $P_0$ and $P_1$, the molten resin specific volume values $V_0$ and $V_1$ and the constant $\omega$, the value for the constant $\pi_1$ can be calculated by the following equation:

$$\frac{V_o - \omega}{V_1 - \omega} = \frac{\frac{R' \cdot T_o}{P_o + \pi_1}}{\frac{R' \cdot T_o}{P_1 + \pi_1}}$$

$$= \frac{P_1 + \pi_1}{P_o + \pi_1}$$

$$= \frac{P_o + \pi_1 + \Delta P}{P_o + \pi_1} \quad (\because \Delta P = P_1 - P_o)$$

$$= 1 + \frac{\Delta P}{P_o + \pi_1}$$

When the values for the constants $\omega$ and $\pi_1$ have been obtained, it is possible to calculate the value for the constant $R'$ by the equation (12). For other types of plasticized synthetic resin, the values for the constants $\omega$, $\pi_1$ and $R'$ may be obtained from the above procedures, if necessary.

As mentioned earlier, since the molten resin temperature value $T$ indicates the molten state such as flowability of the molten resin, the molten resin temperature value $T$ can be generalized as the molten state value $Z$ by the following equation:

$$V = \frac{R' \cdot Z}{P + \pi_1} + \omega$$

The method of establishing the PVZ property relation formula by using the Spencer & Gilmore's equation has been described. Alternatively, the PVZ property relation formula may be established by using the experimental analysis method according to the experimental design (multivariable sequential approximation).

The embodiments of an injection control method according to the present invention are based on the PVZ property relation formula thus established in the above procedure. Prior to explaining each embodiment of the injection control method, the calculation formula used to obtain the travel distance of the screw 19 for injecting a constant weight value of molten resin is explained with reference to FIG. 5.

Figure 5:
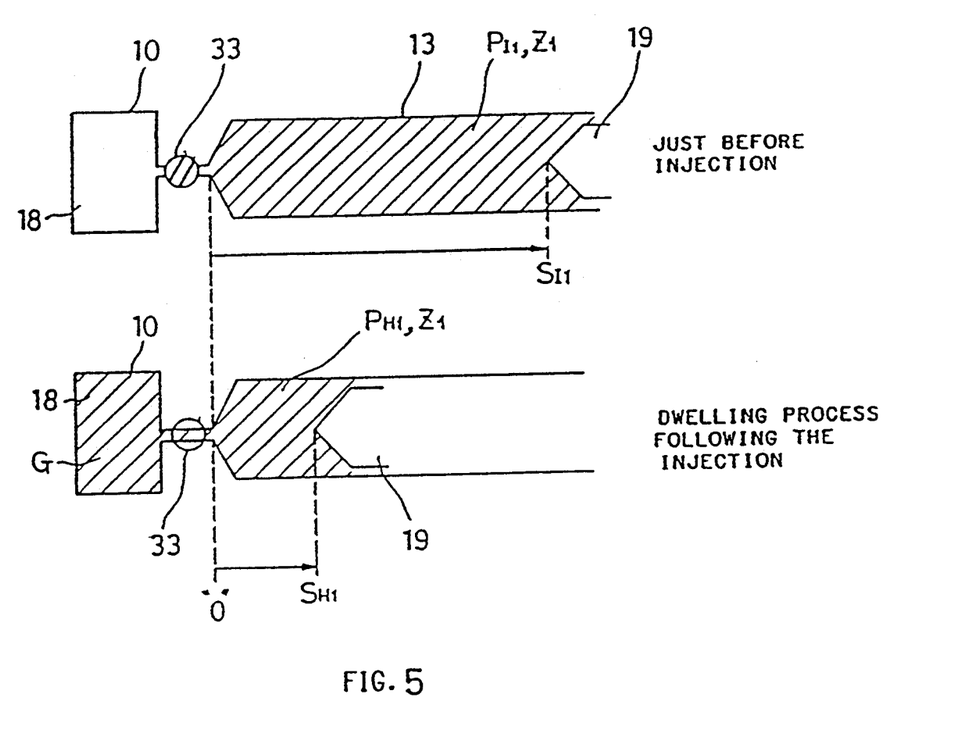
FIG. 5 is a vertical sectional view showing the operation state of the screw for reference in obtaining the calculation formula for the travel distance of the screw for injecting resin of a constant weight value.

First, for plasticized synthetic resin of a constant molten state value $Z_1$, the molten resin pressure value $P$, the positional value $S$ of the screw 19 and the molten resin specific volume value $V$ immediately before injection and those during the dwelling following the injection are set as follows:

The values immediately before injection:
Molten resin pressure value: $P_{I1}$
Positional value of the screw 19: $S_{I1}$
Molten resin specific volume value: $V(P_{I1}, Z_1)$ The values during the dwelling following the injection:
Molten resin pressure value: $P_{H1}$
Positional value of the screw 19: $S_{H1}$ ·
Molten resin specific volume value: $V(P_{H1}, Z_1)$ The positional values $S_{I1}$ and $S_{H1}$ of the screw 19 are based on the distance from the position of the screw 19 indicated by the positional value "0". These positional values $S_{I1}$ and $S_{H1}$ are corrected values based on the remaining molten resin volume.

The weight value $G$ of the molten resin injected by one injecting operation into the cavity 18 of the mold 19 can be expressed as follows:

$$G = A \left( \frac{S_{I1}}{V(P_{I1}, Z_1)} - \frac{S_{H1}}{V(P_{H1}, Z_1)} \right) \tag{13}$$

in which
A: projected sectional area of the screw 19
This equation (13) can be rewritten as follows:

$$G = A \cdot S_{I1} \left[ \frac{1}{V(P_{I1}, Z_1)} - \frac{1}{V(P_{H1}, Z_1)} \right] + \tag{14}$$

$$A \cdot \frac{1}{V(P_{H1}, Z_1)} (S_{I1} - S_{H1})$$

The travel distance $S_D$ of the screw 19 to the position for injection is expressed as follows:

$$S_D = S_{I1} - S_{H1} \tag{15}$$

When the equation (15) is substituted in the equation (14) and rearranged, the following equation is obtained:

$$S_D = S_{I1} - S_{H1} \tag{16}$$

$$= V(P_{H1}, Z_1) \cdot \left\{ \frac{G}{A} - S_{I1} \cdot \left[ \frac{1}{V(P_{I1}, Z_1)} - \frac{1}{V(P_{H1}, Z_1)} \right] \right\}$$

In the equation (16), the projected sectional area $A$ of the screw 19 is known. The positional value $S_{I1}$ of the screw 19 immediately before injection is detected by the screw position detector 28. The molten resin specific volume values $V(P_{I1}, Z_1)$ and $V(P_{H1}, Z_1)$ are obtained from the PVZ property relation formula that has been established in the aforementioned procedure on the basis of the molten resin temperature value (molten state value) $Z$ and molten resin pressure values $P_{I1}$ and $P_{H1}$ detected by the resin temperature detector 30 and by the oil pressure detector 31, respectively, or on the basis of the molten state value (molten resin temperature value) $Z_1$ and molten resin pressure values $P_{I1}$ and $P_{H1}$ to be set.

Therefore, by using the equation (16), it is possible to obtain the travel distance $S_D$ of the screw 19, which keeps the injected resin weight value $G$ constant.

Third Embodiment

Figure 6:
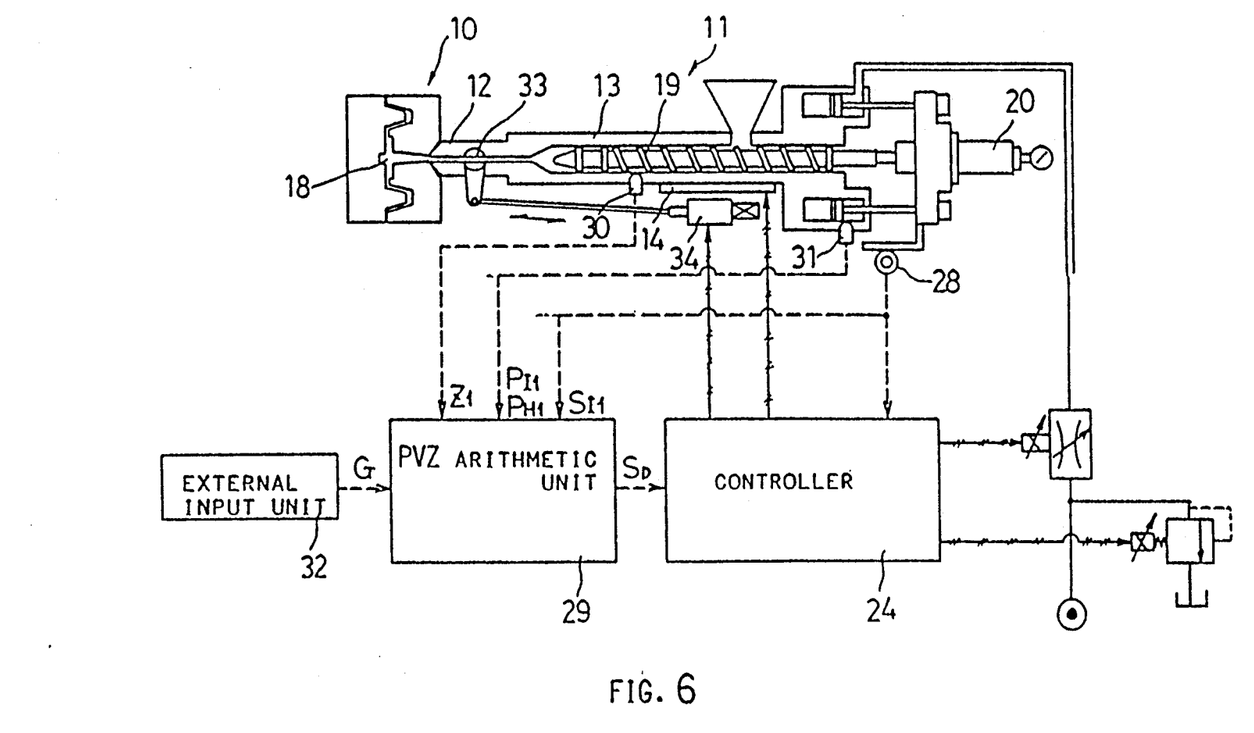
FIGS. 6 and 7 are semi-diagrammatical vertical sectional views of molding systems to which the third and fourth embodiments of a control method of the present invention are applied.

An embodiment of the injection control method according to the present invention is described on the assumption that the screw position detector 28 detects the positional value $S_{I1}$ of the screw 19 immediately before injection, the resin temperature detector 30 detects the molten resin temperature value (molten state value) $Z_1$, and the oil pressure detector 31 detects the molten resin pressure values $P_{I1}$ and $P_{H1}$ immediately before injection and during the dwelling following the injection, and that each of these detectors outputs the detected value to the PVZ arithmetic unit 29, as shown in FIG. 6.

First, the injection weight value G, as the target weight value of a product, is input through the external Input unit 32 to the PVZ arithmetic unit 29. The screw 19 is rotated and retreated while the amount of molten resin to be injected is measured. After the rotation of the screw 19 is stopped, a pushing force is applied to the screw 19. Then, the screw position detector 28 detects the positional value $S_{I1}$ of the screw 19 immediately before injection, with the block valve 33 closed. At the same time, the oil pressure detector 31 detects the molten resin pressure valve $P_{I1}$ (or pushing force value $P_{I1}$), and the resin temperature detector 30 detects the molten resin temperature value (molten state value) $Z_1$. These values are input to the PVZ arithmetic unit 29.

The block valve 33 is then opened so that injection is started. As the screw 19 is moved forward, the cavity 18 of the mold 10 is filled with the injected molten resin. When the cavity 18 has been almost completely filled up, the dwelling process starts. The molten resin pressure value $P_{H1}$ (pushing force value $p_{H1}$) during the dwelling process following the injection is also detected by the oil pressure detector 31 and input to the PVZ arithmetic unit 29. The PVZ arithmetic unit 29 then calculates the travel distance $S_D$ of the screw 19 by the equation (16), from the input positional value $S_{I1}$, molten resin pressure values $P_{I1}$ and $P_{H1}$ and molten resin temperature value (molten state value) $Z_1$, on the basis of the PVZ property relation formula. The calculated travel distance $S_D$ is sent to the controller 24 where it is compared with the positional value provided by the screw position detector 28. When the travel distance $S_D$ is equal to the positional value, the controller 24 closes the block valve 33, thus terminating the injection of the molten resin into the cavity 18 of the mold 10.

Thus, according to this embodiment, the travel distance $S_D$ for injection of the resin of a constant weight value G can be obtained even if the molten resin pressures $P_{I1}$ and $P_{H1}$ and the molten resin temperature value (molten state value) $Z_1$ vary.

Fourth Embodiment

Figure 7:
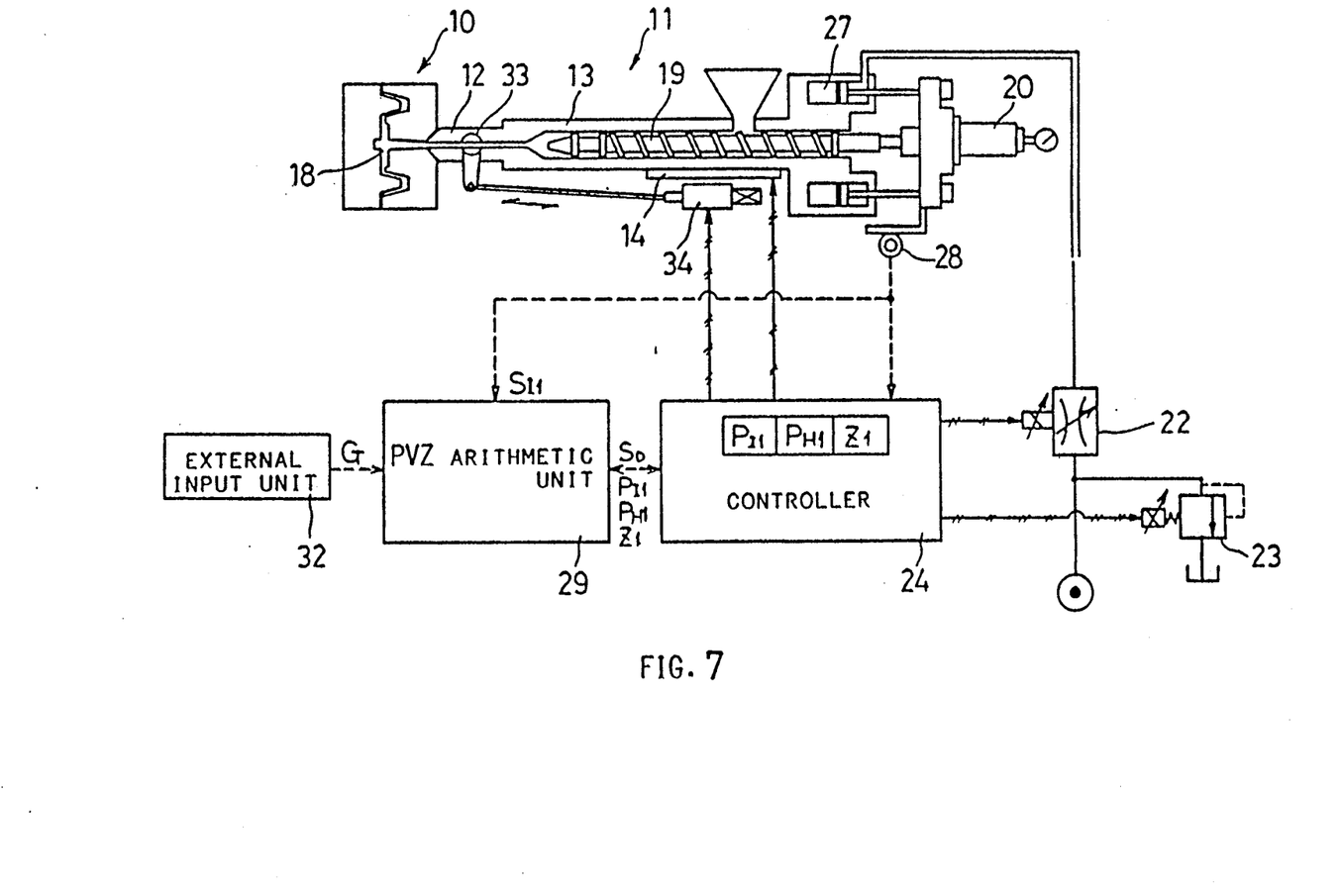

Another embodiment of the injection control method is described on the assumption that the positional value $S_{I1}$ of the screw 19 immediately before injection is detected and transmitted to the PVZ arithmetic unit 29, and that the molten resin pressures values $P_{I1}$ and $P_{H1}$ and molten resin temperature values (molten state value) $Z_1$ preliminarily set in the controller 24 are also transmitted to the PVZ arithmetic unit 29, as shown in FIG. 7. For this embodiment, only the operations different from those in the third embodiment is described, with the description of same operations omitted.

The controller 24 controls the electromagnetic flow valve 22 and electromagnetic pressure valve 23 so that set molten resin pressure values $P_{I1}$ and $P_{H1}$ are obtained. The controller 24 also controls the heater 14 so that set molten resin temperature value (molten state value) $Z_1$ is obtained. The PVZ arithmetic unit 29 calculates the travel distance $S_D$ from the positional value $S_{I1}$ of the screw 19 immediately before injection input from the screw position detector 28 and the molten resin pressure values $P_{I1}$ and $P_{H1}$ and molten resin temperature value (molten state value) $Z_1$ set in the controller 24, on the basis of the PVZ property relation formula. The calculated travel distance $S_D$ is sent to the controller 24. Other operations are the same as those in the third embodiment.

In the third embodiment, the latest molten resin pressures values $P_{I1}$ and $P_{H1}$ and molten resin temperature values (molten state value) $Z_1$ detected are used for calculating the travel distance $S_D$. Alternatively, the calculation may be based on the values of $P_{I1}$, $P_{H1}$ and $Z_1$ detected in the last injection operation or on the mean values of $P_{I1}$, $P_{H1}$ and $Z_1$ detected in the previous operations for a specified period.

The molten resin temperature value is used as the molten state value Z in the third and fourth embodiments. Needless to say, the revolution of the screw 19 during the plasticization and measurement process, the time required for the measurement or the back-pressure value of the screw 19 may be used for the molten state value Z.

As a modified embodiment, instead of the block valve 33 in the flow passage 16 of the nozzle 12, a shut-off valve may be provided at the gate 17 of the mold 10.

POTENTIAL INDUSTRIAL APPLICATION

According to the present invention, the resin property is easily detected in an injection molder installed at the injection molding site by using the plasticized synthetic resin currently used for injection molding. In addition, the resin property thus detected can be used directly for controlling the actual injection molding process at the site. Therefore, the resin property detection method and the injection control method for an injection molder according to the present invention are useful particularly where the property of the plasticized synthetic resin material varies with the ratio of reclaimed resin content or additive content.

What is claimed is:

1. A resin property detection method for an injection molder which has a flow path opening/closing mechanism between the cylinder of the injection molder and the cavity of a mold so as to block the plasticized synthetic resin flow between the cylinder and the cavity, comprising the steps of:

conducting the following two processes sequentially, with plasticized synthetic resin of a specified molten resin state value Z:

(a) the first process comprising the steps in a closing state of the flow path opening/closing mechanism to block the plasticized synthetic resin flow after measurement of the resin, applying a reference pushing force value $p_o$ to the screw to effect the balancing movement of the screw under the blocked state of the flow, and obtaining the positional value of the screw at the reference stop position where the screw stops its balancing movement, and (b) the second process comprising the steps of applying a pushing force value p, different from the reference pushing force $p_o$, to the screw to effect the balancing movement of the screw, obtaining the positional value of the screw at the position where the screw stops its balancing movement, and calculating the travel distance $S_T$ from the reference stop position of the screw; and obtaining the relational formula for the molten resin pressure value P and the molten resin volume value with the specified molten resin state value Z through the approximation of the relation among the pushing force values $p_o$ and p and the travel distance $S_T$ by using a specified functional equation.

2. The resin property detection method for an injection molder as according to claim 1, wherein said first and second processes are repeated under the different molten state values Z, wherein the pushing force value p to be applied to the screw is varied in the second process, and wherein the relational formula for the molten resin pressure value P, the molten resin volume value and the molten state value Z is obtained through the approximation of the relation among the pushing force values $p_o$ and p, the travel distance $S_T$ and the molten state value Z by using a specified functional equation.

3. A resin property detection method for an injection molder which has a flow path opening/closing mechanism between the cylinder of the injection molder and the cavity of a mold so as to block the plasticized synthetic resin flow between the cylinder and the cavity, comprising the steps of:

conducting the following two processes sequentially, with plasticized synthetic resin of a specified molten resin state value Z:

(a) the first process comprising the steps in a closing state of the flow path opening/closing mechanism to block the plasticized synthetic resin flow after measurement of the resin, applying a reference pushing force value $p_o$ to the screw to effect the balancing movement of the screw under the blocked state of the flow, and obtaining the positional value of the screw at the reference stop position where the screw stops its balancing movement, and (b) the second process comprising the steps of applying a pushing force value p, different from the reference pushing force $p_o$, to the screw to effect the balancing movement of the screw, obtaining the positional value of the screw at the position where the screw stops its balancing movement, and calculating the travel distance $S_T$ from the reference stop position of the screw; and obtaining the relational formula for the molten resin pressure value P and the molten resin volume value with the specified molten resin state value Z through the approximation of the relation among the pushing force values $p_o$ and p and the travel distance $S_T$ by using the functional equation:

$$V/V_o = \exp\{a(\sqrt{P/P_o} - 1)\}$$

in which
V: molten resin specific volume at molten resin pressure value P
$V_o$: molten resin specific volume at reference molten resin pressure value $P_o$
$P_o$: reference molten resin pressure value (reference pushing force value $p_o$),
P: molten resin pressure value (pushing force value p)

a: constant.

4. A resin property detection method for an injection molder which has a flow path opening/closing mechanism between the cylinder of the injection molder and the cavity of a mold so as to block the plasticized synthetic resin flow between the cylinder and the cavity, comprising the steps of:

conducting the following two processes sequentially, with plasticized synthetic resin of a specified molten resin state value Z:

(a) the first process comprising the steps in a closing state of the flow path opening/closing mechanism to block the plasticized synthetic resin flow after measurement of the resin, applying a reference pushing force value $p_o$ to the screw to effect the balancing movement of the screw under the blocked state of the flow, and obtaining the positional value of the screw at the reference stop position where the screw stops its balancing movement, and (b) the second process comprising the steps of applying a pushing force value p, different from the reference pushing force $p_o$, to the screw to effect the balancing movement of the screw, obtaining the positional value of the screw at the position where the screw stops its balancing movement, and calculating the travel distance $S_T$ from the reference stop position of the screw; and repeating said first and second processes under the different molten state values Z, and varying the pushing force value p applied to the screw in the second process, and obtaining the relational formula for the molten resin pressure value P, the molten resin volume value and the molten state value Z through the approximation of the relation among the pushing force values $p_o$ and p, the travel distance $S_T$ and the molten state value Z by using the functional equation:

$$V/V_o = \exp\{a(Z)(\sqrt{P/P_o} - 1)\}$$

in which
$V_O$: molten resin specific volume at reference molten resin pressure value $p_O$
V: molten resin specific volume at molten resin pressure value p
$P_O$: reference molten resin pressure value (reference pushing force value $p_O$),
P: molten resin pressure value (pushing force value p)
a(Z): constant fixed by the molten resin state value Z.

5. The resin property detection method for an injection molder as according to any one of claims 1 through 4, further comprising the steps of:

conducting the following three processes sequentially with the plasticized synthetic resin of said molten state value Z:

(a) the first process comprising the steps of closing the flow path opening/closing mechanism to block the plasticized synthetic resin flow, and under the blocked state of the flow, applying either of the pushing force values $p_o$ and p to the screw, so as to effect the balancing movement of the screw, and obtaining the positional value of the screw at the first stop position where the screw stops its balancing movement, (b) the second process comprising the steps of opening the flow path opening/closing mechanism to allow the plasticized synthetic resin to flow, and under the available state of the flow, applying a pushing force to the screw so as to permit plasticized synthetic resin of an appropriate weight value G to be injected, and (c) the third process comprising the steps of closing the flow path opening/closing mechanism after injecting the plasticized synthetic resin of weight value G to block the plasticized synthetic resin flow, and under the blocked state of the flow, applying a pushing force of the same value as that for the first process to the screw so as to effect the balancing movement of the screw, and obtaining the positional value of the screw at the second stop position where the screw stops its balancing movement;

calculating the molten resin volume value of injected plasticized synthetic resin on the basis of the positional values of the screw at the first and second stop positions; and obtaining the molten resin specific volume value V from the thus calculated molten resin volume value and the weight value G.

6. The resin property detection method for an injection molder as according to in any one of claims 1 through 4, wherein if said flow path opening/closing mechanism is a block valve provided in the nozzle of the injection molder and if the molten plasticized synthetic resin volume value remaining in the space between the front end of the screw and the block valve is known as a design value, the remaining molten resin volume value is converted into the travel distance of the screw and added to said travel distance $S_T$, the injected molten plasticized synthetic resin volume value being obtained from the sum of the travel distances.

7. The resin property detection method for an injection molder as according to in any of claims 1 through 4, wherein if said flow path opening/closing mechanism is a block valve provided in the nozzle of the injection molder and if the molten plasticized synthetic resin volume value remaining in the space between the front end of the screw and the block valve is unknown, the method further comprises the steps of:

applying a specified pushing force value p to the screw at various positions under the blocked state of the flow, with the block valve closed and with plasticized synthetic resin of said molten state value Z;

calculating the travel distance of the screw from the last stop position to the position where the screw stops following the balancing movement under said specified pushing force value p;

obtaining the positional value of the screw at which the travel distance of the screw becomes zero under said pushing force value p, by the extrapolation on the basis of each stop position and the corresponding travel distance;

adding the obtained positional value to said travel distance $S_T$; and obtaining the molten resin volume value of injected plasticized synthetic resin from the travel distance thus obtained by addition.

8. A resin property detection method for an injection molder which has a flow path opening/closing mechanism between the cylinder of the injection molder and the cavity of a mold so as to block the plasticized synthetic resin flow between the cylinder and the cavity, comprising the steps of:

conducting the following three processes sequentially with plasticized synthetic resin of various molten state values Z:

(a) the first process comprising the steps of closing the flow path opening/closing mechanism to block the plasticized synthetic resin flow, and under the blocked state of the flow applying various pushing force value p to the screw so as to effect the balancing movement of the screw, and obtaining the positional value of the screw at the first stop position where the screw stops its balancing movement under each of said various pushing force values P, (b) the second process comprising the steps of opening the flow path opening/closing mechanism to allow the plasticized synthetic resin to flow, and under the available state of the flow, applying a pushing force to the screw so as to permit plasticized synthetic resin of an appropriate weight value G to be injected and (c) the third process comprising the steps of closing the flow path opening/closing mechanism after injecting the plasticized synthetic resin of weight value G to block the plasticized synthetic resin flow, and under the blocked state of the flow, applying said various pushing force values p to the screw so as to effect the balancing movement of the screw, and obtaining the positional value of the screw at the second stop position where the screw stops its balancing movement under each of said various pushing force values p;

obtaining the molten resin volume value of the injected plasticized synthetic resin on the basis of the positional values of the screw at the first and second stop positions under each of the various pushing force values p for each molten state value Z; and calculating the molten resin specific volume value $\overline{V}$ from each of the thus calculated molten resin volume values and said weight value G, thereby obtaining the PVZ property relational formula for the molten resin pressure value P, the molten resin specific volume value V and the molten state value Z.

9. The resin property detection method for an injection molder as according to any one of claims 1 through 4 and 8, wherein said molten state value Z is a value selected from among the molten resin temperature, the revolution or the back-pressure of the screw and the time required for measuring the molten resin.

10. The resin property detection method for an injection molder as according to any one of claims 1 through 4 and 8, wherein said flow path opening/closing mechanism is a block valve provided in the nozzle of the injection molder.

11. The resin property detection method for an injection molder as according to any one of claims 1 through 4 and 8, wherein said flow path opening/closing mechanism is a shut-off valve provided in the mold for formation.

12. An injection control method for an injection molder, for controlling the weight of the plasticized synthetic resin injected from the cylinder of the injection molder into the cavity of a mold, comprising the steps of:

calculating the travel distance $S_D$ of the screw for the position for injecting plasticized synthetic resin by the amount corresponding to the target weight value G of a product, by using a specified calculation formula, on the basis of the target weight value G, the molten state value Z of the plasticized synthetic resin to be injected, the molten resin pressure value $P_I$ and the positional value $S_I$ immediately before injection, the molten resin pressure value $P_H$ during the dwelling process following the injection, and the PVZ property relation formula for the plasticized synthetic resin;

presetting the calculated travel distance $S_D$; and terminating the injection of the plasticized synthetic resin into the cavity of the said mold when the screw has moved for the present travel distance $S_D$ from the stop position immediately before injection.

13. An injection control method for an injection molder as according to claim 12, wherein said specified calculation formula is:

$$S_D = S_I - S_H = V(P_H, Z) \cdot \{G/A - S_I [1/V(P_I, Z) - 1/V(P_H, Z)]\}$$

wherein
- $S_H$: the positional value of the screw during the dwelling process following the injection, for the molten state value Z
- $S_I$: the positional value of the screw immediately before the injection, for the molten state value Z
- G: the weight value of a product
- A: the projected sectional area of the screw
- $V(P_H, Z)$: the molten resin specific volume value for the molten state value Z and molten resin pressure value $P_H$ during the dwelling process following the injection with the molten state value Z
- $V(P_I, Z)$: the molten resin specific volume value for the molten state value Z and the molten resin pressure value $P_I$ immediately before the injection with the molten state value Z.

* * * * *